No. 727,337. PATENTED MAY 5, 1903.
F. L. FORSTER.
GUIDE FOR WOODWORKING MACHINES.
APPLICATION FILED OCT. 2, 1902.

NO MODEL.

Witnesses
C. H. Walker
H. H. Johnson

Inventor
Frank L. Forster
By Eugene W. Johnson
Attorney

No. 727,337. Patented May 5, 1903.

UNITED STATES PATENT OFFICE.

FRANK L. FORSTER, OF SHELBYVILLE, INDIANA, ASSIGNOR OF ONE-HALF TO JACOB A. CONREY AND MARY CONREY, OF SHELBYVILLE, INDIANA.

GUIDE FOR WOODWORKING-MACHINES.

SPECIFICATION forming part of Letters Patent No. 727,337, dated May 5, 1903.

Application filed October 2, 1902. Serial No. 125,663. (No model.)

*To all whom it may concern:*

Be it known that I, FRANK L. FORSTER, a citizen of the United States, residing at Shelbyville, in the county of Shelby and State of Indiana, have invented certain new and useful Improvements in Guides for Shaper or Frizzing Machines, of which the following is a specification.

My invention relates to an improvement in guides for woodworking-machines having vertically-disposed revolving cutters, the object being to provide a guide for the material that is fed to the cutter for the purpose of jointing, forming a bead on the edge of the lumber, or for frizzing the material fed to the cutter, the guides being so constructed that they may be used in connection with a cutter-guard, also providing a guide which can be swung upon the table, so that the guides are not necessarily parallel to the edge of the table, as will be hereinafter set forth.

Figure 1:
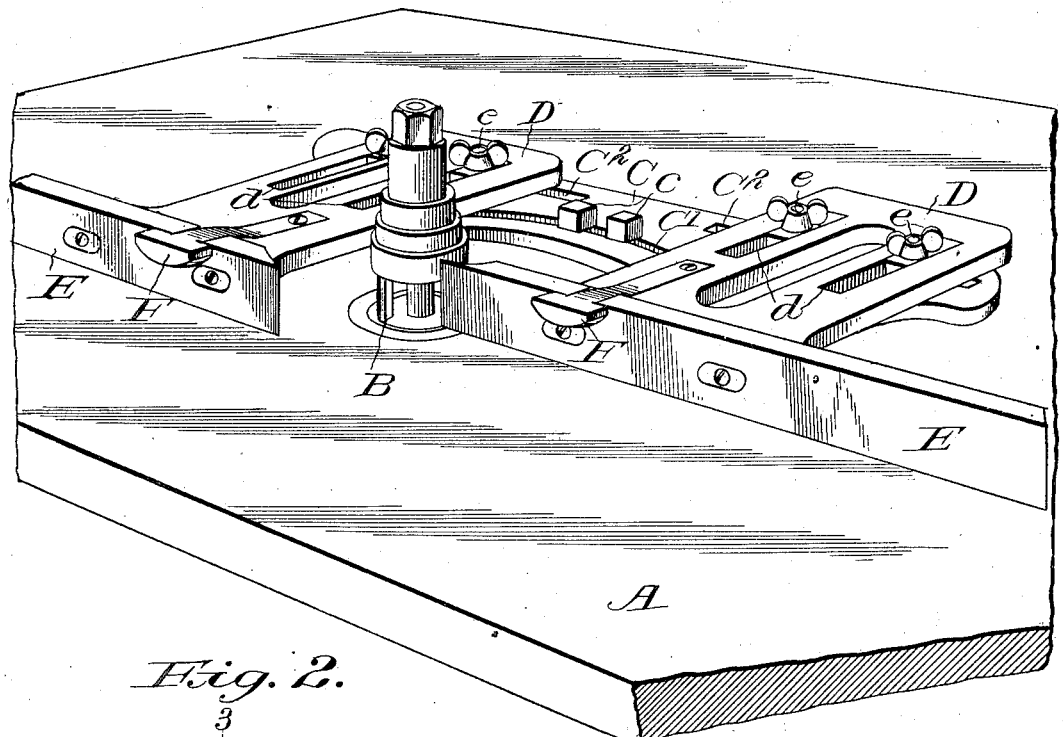
Figure 2:
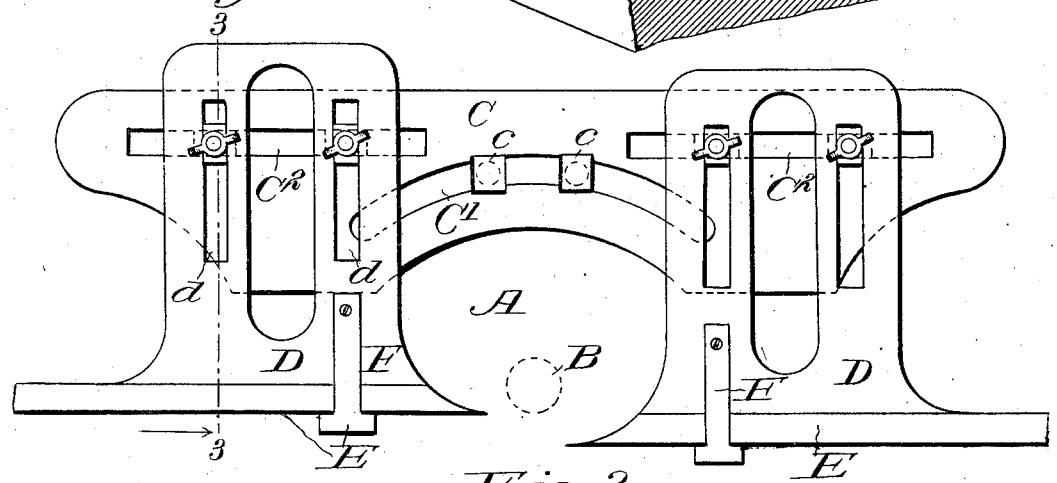
Figure 3:

In the accompanying drawings, Figure 1 is a perspective view of a shaper or frizzer guide attached to a work-table having a vertically-disposed cutter. Fig. 2 is a plan view, and Fig. 3 a sectional view on the line 3 3.

In a practical embodiment of my invention the work or jointer table A is provided with a vertically-disposed and rapidly-rotated cutter-head B, of any suitable construction, the knives of which are removable to suit the special work to be done. To one side of the cutter the table is provided with threaded apertures for the reception of machine-bolts $c\ c$, which pass through a segmental slot in a plate C, which is attached securely by the bolts and is adjustable upon the table A. The segmental slot C' permits the plate C to be adjusted upon the table at any desired angle with respect to the edges thereof, so that said plate and the guides carried thereby may be adjusted to adapt the device to the position of the operator, as may be most convenient. The base-plate C is provided, preferably rear of the segmental slot C', with straight slots $C^2$, which are on a line with each other, and the edges of said slots may be suitably shaped or undercut to receive the heads of set-screws $e\ e$, which carry thumb-nuts, as shown, for connecting the guides or fences D D to the base-plate C.

The guides or fences D D are constructed to overlie a portion of the bed-plate C and to be adjustable thereon in two directions, and each guide D has two parallel slots $d\ d$, and set-screws are provided for connecting each guide at two points to the bed-plate. It is obvious that when the set-screws are loosened the guides may be moved toward or away from each other, permitting an adjustment for cutters of different sizes, and that said fences may be moved in and out to determine how much the cutter will remove from the material which is fed thereto. By providing the guides with parallel slots in adjusting the same the proper angular relation will be maintained between the bed-plate and said guides.

The outer faces of the guides D D have attached thereto by means of bolts or set-screws vertical strips E, which depend from the parts D sufficient to rest upon the top of the table. They also extend above the horizontal portion of the guides. The strips E may be made of hard wood and can be replaced when worn.

The guides D D are provided with spring presser-bars F F, the projecting ends of which will engage with the upper edge of the lumber to hold the same against the face of the table, and these presser-bars when not desired may be removed or swung to one side, so as to rest upon the upper face of the guides.

By the construction shown each of the parts D D are adjustable to and from each other upon the base-plate and in and out, one part to determine the amount or the depth of the edge that will be operated upon or removed by the cutter and the other guide provides a bearing for the lumber after it has been edged.

Having thus described my invention, what I claim as new, and desire to secure by Letters Patent, is—

1. The combination with a woodworking-machine comprising a table and a cutter which is disposed vertically with respect to the table, of a work-guide therefor consisting of a bed-plate having therethrough a centrally-positioned segmental slot, and slots which extend longitudinally through the bed-plate, and a pair of guides each having slots and clamping means for connecting the guides to the bed-plate to maintain the guides at right angles to the longitudinal slots through the bed-plate, substantially as shown.

2. In combination with a work-table having a rotary cutter which projects through the table, of a bed-plate attached to the table and adjustable radially with respect to the cutter, the bed-plate having therethrough longitudinal slots, a pair of guides connected to the bed-plate to be independently adjustable thereon at right angles with respect to the longitudinal slots of the bed-plate, and guide-strips attached to the guides to bear upon the top of the table, substantially as shown.

3. In a guide for woodworking-machines, the combination with a work-table having a rotary cutter which projects above the top of the table and threaded apertures to one side of the cutter, of a work-guide comprising a bed-plate having a segmental slot through which pass bolts for connecting the bed-plate to the work-table, and a pair of guides connected to the bed-plate to be longitudinally and laterally adjustable thereon, and strips removably secured to the edges of the guides adjacent to the cutter, substantially as shown.

In testimony whereof I affix my signature in the presence of two witnesses.

FRANK L. FORSTER.

Witnesses:
J. K. JAMESON,
ROBERT W. BUXTON.